(12) United States Patent
Ekhoff

(10) Patent No.: US 8,553,518 B1
(45) Date of Patent: Oct. 8, 2013

(54) DISC SPINDLE WITH INTERNAL PARTICULATE REMOVAL

(76) Inventor: Donald L. Ekhoff, Morgan Hill, CA (US)

( * ) Notice: Subject to any disclaimer, the term of this patent is extended or adjusted under 35 U.S.C. 154(b) by 0 days.

(21) Appl. No.: 13/495,628

(22) Filed: Jun. 13, 2012

Related U.S. Application Data

(60) Provisional application No. 61/496,365, filed on Jun. 13, 2011.

(51) Int. Cl.
*G11B 23/00* (2006.01)
*G11B 17/08* (2006.01)

(52) U.S. Cl.
USPC ..................................... 369/269; 360/99.04

(58) Field of Classification Search
USPC ................. 369/269, 266, 44.14, 44.15, 271, 369/263, 270.1, 263.1; 360/99.04, 99.08, 360/99.09; 250/492.3
See application file for complete search history.

(56) References Cited

U.S. PATENT DOCUMENTS

| | | | |
|---|---|---|---|
| 4,755,981 A | 7/1988 | Ekhoff | |
| 5,025,340 A | 6/1991 | Peters | |
| 5,757,584 A | 5/1998 | Schick | |
| 6,556,536 B1 * | 4/2003 | Reynolds et al. | 369/269 |
| 6,836,461 B2 | 12/2004 | Baum et al. | |
| 7,795,559 B2 | 9/2010 | Wojcik et al. | |

* cited by examiner

*Primary Examiner* — Nabil Hindi
(74) *Attorney, Agent, or Firm* — Mitch Harris, Atty at Law, LLC; Andrew Mitch Harris

(57) ABSTRACT

A disc spindle provides removal of particulates generated by internal parts of mechanisms, including the disc clamping mechanism, air bearing rotor, and other moving parts provides a port that is coupled to a vacuum system to remove particulate from the areas in which they are generated. In other aspects of the invention, vacuum evacuation of rotary and other bearings in a mechanical system employed in a clean room environment are prevented from contaminating the environment by removing particulate at the locations in which it is generated by friction, contact, or other means such as being introduced from the pressure channel in an air bearing feed.

16 Claims, 4 Drawing Sheets

US 8,553,518 B1

DISC SPINDLE WITH INTERNAL PARTICULATE REMOVAL

This U.S. Patent application claims priority under 35 U.S.C. §119 to U.S. Provisional Patent Application Ser. No. 61/496,365 filed on Jun. 13, 2011.

CROSS-REFERENCE TO RELATED APPLICATIONS

The present U.S. Patent Application is related to co-pending U.S. patent application Ser. No. 13/495,616, entitled "DISC SPINDLE WITH FLEXIBLE CAP CLAMPING", filed contemporaneously herewith, by the same inventor. The above-referenced U.S. Patent Application is incorporated herein by reference.

BACKGROUND OF THE INVENTION

1. Field of the Invention

The present invention relates generally to spindles for holding and rotating hard disc platters and removable media during manufacturing inspection processes, and in general to actuator bearings having vacuum particulate removal for use in a clean environments.

2. Description of the Related Art

Disc spindles are in widespread use in the media and drive manufacturing fields. The media are secured and inspected by inserting a clamp at the end of the spindle through the media and then activating the clamp to secure the media.

Existing spindles, and actuators in general, generate particulate due to their moving parts and, in the case of the spindles, contact with the optical media. The particulate can lead to data errors, and thus it is desirable to reduce the amount and impact of particulate deposition caused during the inspection process.

SUMMARY OF THE INVENTION

The above objectives and others are achieved in a spindle having internal vacuum channels that remove particulate, and its method of operation, as well as generally in any actuator bearing having a vacuum channel for particulate removal.

In accordance with an embodiment of the invention, the spindle includes a channel for communication with a vacuum system. The channel may be a channel to a clamp to remove particulate generated by moving parts of the clamp or contact with a media disc and/or a channel to a shroud covering the end of a bearing, which may be a pressurized air bearing for providing a low friction rotation of the disc.

In accordance with another embodiment of the invention, an actuator bearing includes a channel for communication with a vacuum system. The actuator may be a linear or rotational actuator, and the bearing may be an air bearing, or may be a contacting bearing that is unsealed or wherein the seal is enhanced in operation by the application of vacuum, whereby generated particulate is drawn away from the bearing in order to prevent introduction of particulate in to a clean environment.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention encompasses devices having internal vacuum particulate removal channels such as clamping air bearing spindles for securing and rotating media discs during inspection and other manufacturing processes. Such devices generate particulate that can contaminate the environment of a clean room and articles such as media handled by the devices. The present invention provides low particulation and a simple design by including vacuum channels that draw generated particulate away from the locations where the particulate is generated within or at the external surfaces of the device. For example, vacuum can be applied to air bearings to remove particulate introduced by the pressurizing system. Also, vacuum can be applied to actuators both linear and rotary so that particulate is not emitted from their bearing seals. Vacuum may also be applied at external clamping locations, such as the clamping cap of the disc spindle disclosed herein and described in further detail in the above-incorporated U.S. Patent Application.

Figure 1:
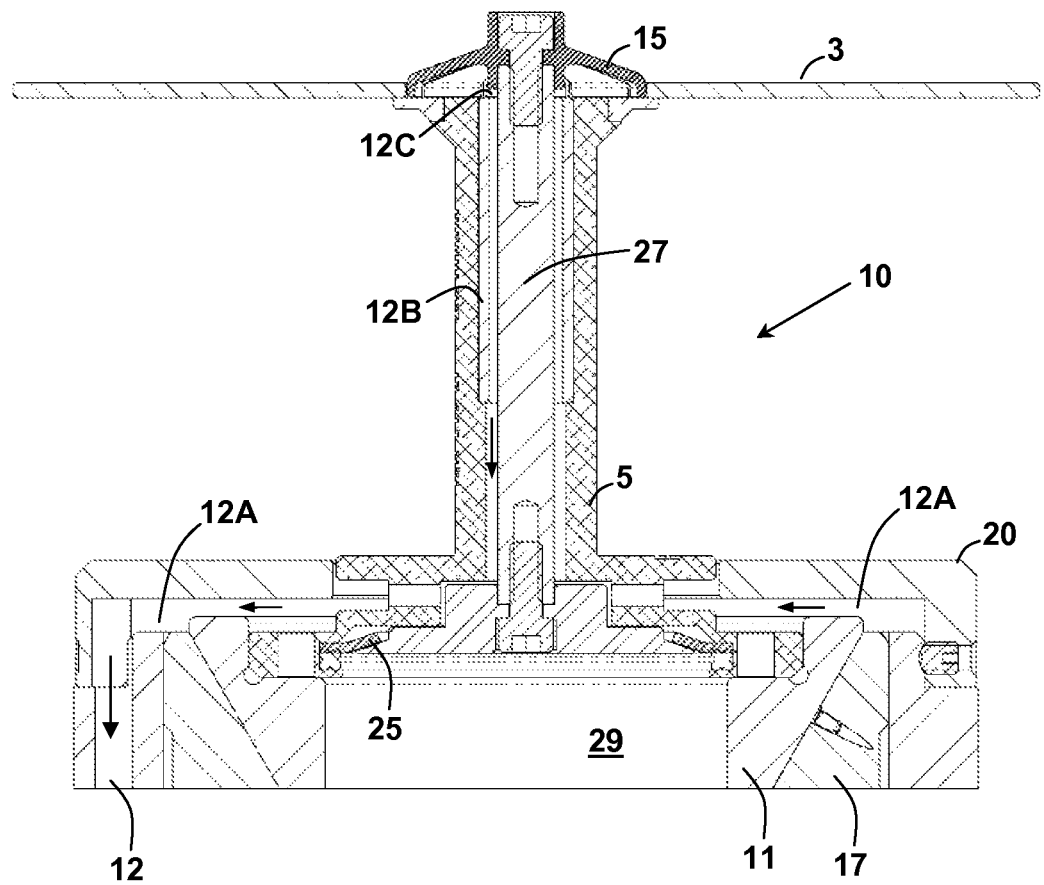
FIG. 1 is a cross-section view of a disc spindle in accordance with an embodiment of the present invention.

Referring now to FIG. 1, a spindle 10 for rotating a media disc 3 during inspection and other manufacturing processes is shown, in accordance with an embodiment of the present invention. Spindle 10, as depicted, includes particulate removal features, such as shroud 20, and channels 12 and 12A formed thereby, which remove particulate from various locations within spindle when ported to a vacuum system. The illustrated clamping techniques disclosed an claimed in the above-incorporated U.S. Patent application are not requirements of the present invention, but may be used in combination to provide enhanced particulate reduction and removal by combining the vacuum particulate removal features of the present invention with the mechanical disc clamping features disclosed in the above-incorporated U.S. Patent Application. Spindle 10 includes a rotary bearing formed by a rotor 11, that turns to rotate a clamp body 5 that includes a disc clamping cap 15 for retaining media disc 3 at an end of spindle 10. Rotor 11 sits in a stator 17 formed by a body of spindle 10 and is floated above stator 17 by a continuous introduction of pressurized air or other gaseous mixture or element, so that an extremely low friction air bearing is formed for rotation of clamp body 5. Void 12A communicates with a channel 12 that couples to a vacuum port when spindle 10 is mounted to remove the air provided to float rotor 11 above stator 17, along with any particulate that might otherwise accumulate in spindle 10. Void 12A further communicates with axial grooves 12B in clamp body 5 that communicate vacuum to further channels 12C to remove particulate generated in the vicinity of disc clamping cap 15. Particulate entering the air bearing from the source of pressurized air (or other gas) and particulate generate at startup due to friction are removed through void 12A, which is in communication with the air gap generated between rotor 11 and stator 17 when the bearing is floated by vacuum, or alternatively by applied aid pressure.

Disc clamping cap 15 is formed from a rigid plastic material such as polyether ether ketone (PEEK) or other suitable material compatible with a clean room environment that will not generate substantial particulate due to mechanical wear over many cycles of use. Alternatively, disc clamping cap 15 may be formed from metal such as heat-treated steel for durability. Disc clamping cap 15 is placed in a clamping state by retracting shaft 27, which in the depicted embodiment is performed by applying a vacuum to the base of rotor 11 at chamber 29, which communicates with a bottom side of a flexible diaphragm 25 mechanically coupled to shaft 27. In accordance with alternative embodiments of the invention, shaft 27 can be replaced with another form of actuator that provides for movement of disc clamping cap 15 when flexible diaphragm is moved. Part of chamber 29 may be filled with material to reduce the volume of air that must be removed to move shaft 27 to activate disc clamping cap 15.

Figure 2A:
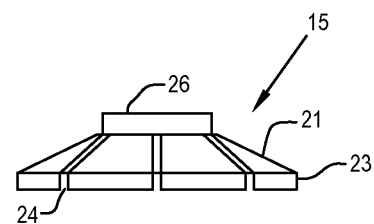
FIG. 2A is a side view and FIG. 2B is a top view showing details of flexible cap 15 of FIG. 1.
Figure 2B:
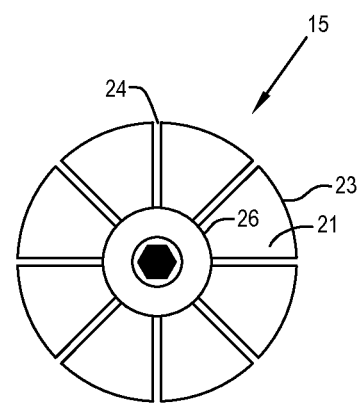

Referring now to FIG. 2A and FIG. 2B, details of disc clamping cap 15 are shown in accordance with an embodiment of the present invention. Disk clamping cap 15, as mentioned above, is formed from a flexible material that expands radially when a hub 26 portion of disc clamping cap 15 is drawn downward toward the spindle body, in order to apply force to the inside annular face of the central aperture in the media being handled. Slits 24 are formed through cap 15 and generally extend through cap 15 except in a region around hub 26, which improves the flexibility of cap 15. Disc clamping cap 15, as depicted, has a conical profile over a portion 21 of disc clamping cap 25 extending from an end away from spindle (distal end) to a second profile portion that has a substantially constant diameter, and thus forms a cylindrically-profiled portion 23. It is the cylindrical-profiled portion that makes contact with the inner face of the aperture through media disc 3, and thus, in the depicted embodiment, disc clamping cap 15 does not require contact with, nor does disc clamping cap 15 substantially contact the outer face of media disc 3, when placed in the clamping state.

Figure 3:
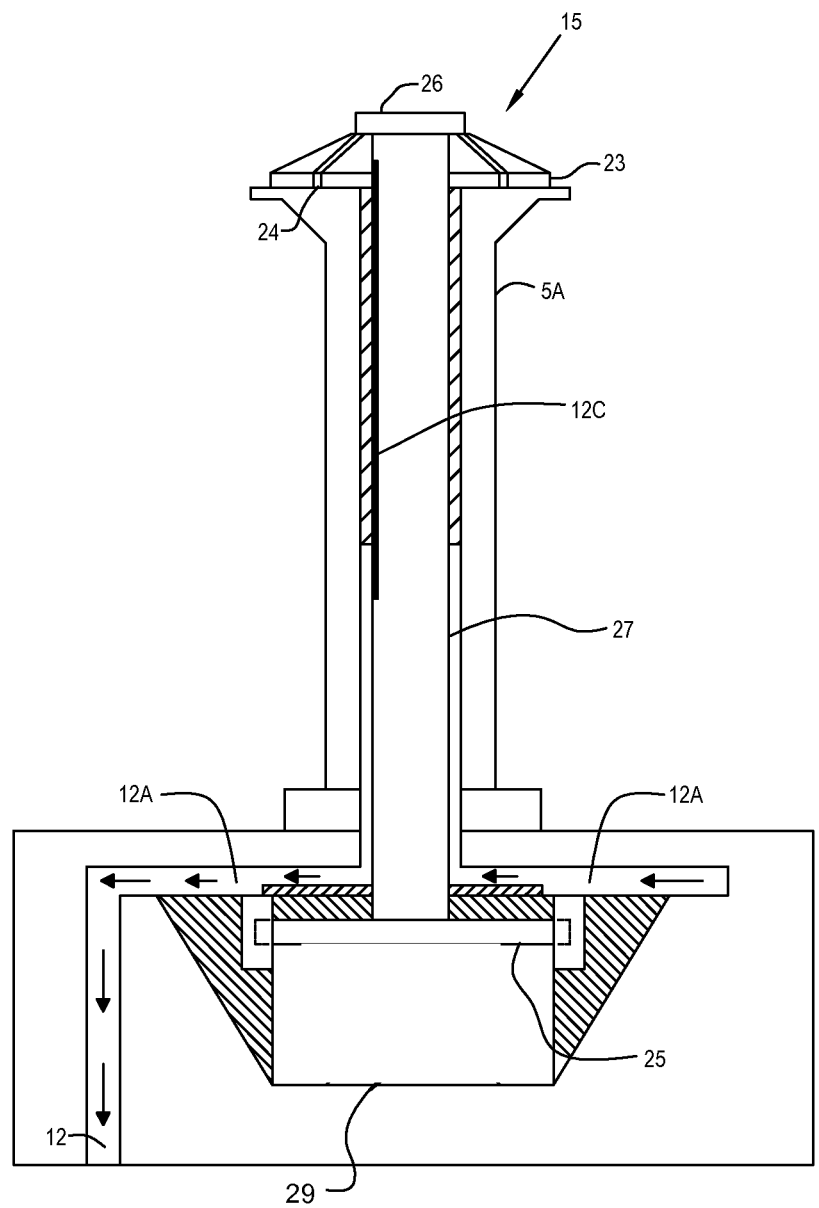
FIG. 3 is a simplified pictorial diagram illustrating operation and structure of vacuum particulate removal features within a spindle in accordance with an embodiment of the present invention.

Referring now to FIG. 3, a spindle in accordance with an embodiment of the invention is shown. A clamp body 5A includes at a distal end, disc clamping cap 15, which is activated by vacuum applied in a chamber 29 below diaphragm 25 as described above with reference to FIG. 1. The movement of diaphragm 25 lowers shaft 27, which, in turn compresses disc clamping cap 15 by drawing hub 26 downward, causing a media disc placed on disc clamping cap 15 to be secured in place. In accordance with other embodiments of the present invention, shaft 27 can be replaced by another type of actuator that moves disc clamping cap 15 in response to pressure or vacuum applied to diaphragm 25. The leverage provided by the above-described mechanism is quite great, as small movement of actuator 27 can produce a substantial force from only slight changes in the diameter of disc clamping cap 15. The combination of features provided in the design described above make it possible to retain the media discs with a vacuum on the order of 0.80 atmosphere.

While vacuum provides a convenient method of operating clamp 15 that is consistent with the additional particulate removal techniques of the present invention, pressure activation of clamp 15 can also be implemented as described in the above-incorporated U.S. Patent application, in accordance with other embodiments of the present invention. In particular, when pressure activation as described in the above-incorporated U.S. Patent Application is used in combination with the techniques of the present invention, any particulate that is introduced from the pressure source can be removed before it can be emitted from clamp body 5A by applying vacuum to a suitable channel within clamp body 5A.

While the terms top and bottom, beneath and above, etc. are used to describe the embodiments depicted in FIGS. 1-3, the terms and orientations used are merely for convenience, and it is understood that the spindle and hubs described above may be used and operated in any orientation and may be moved through different orientations in order to capture and position media discs for inspection and other manufacturing processes.

Figure 4:
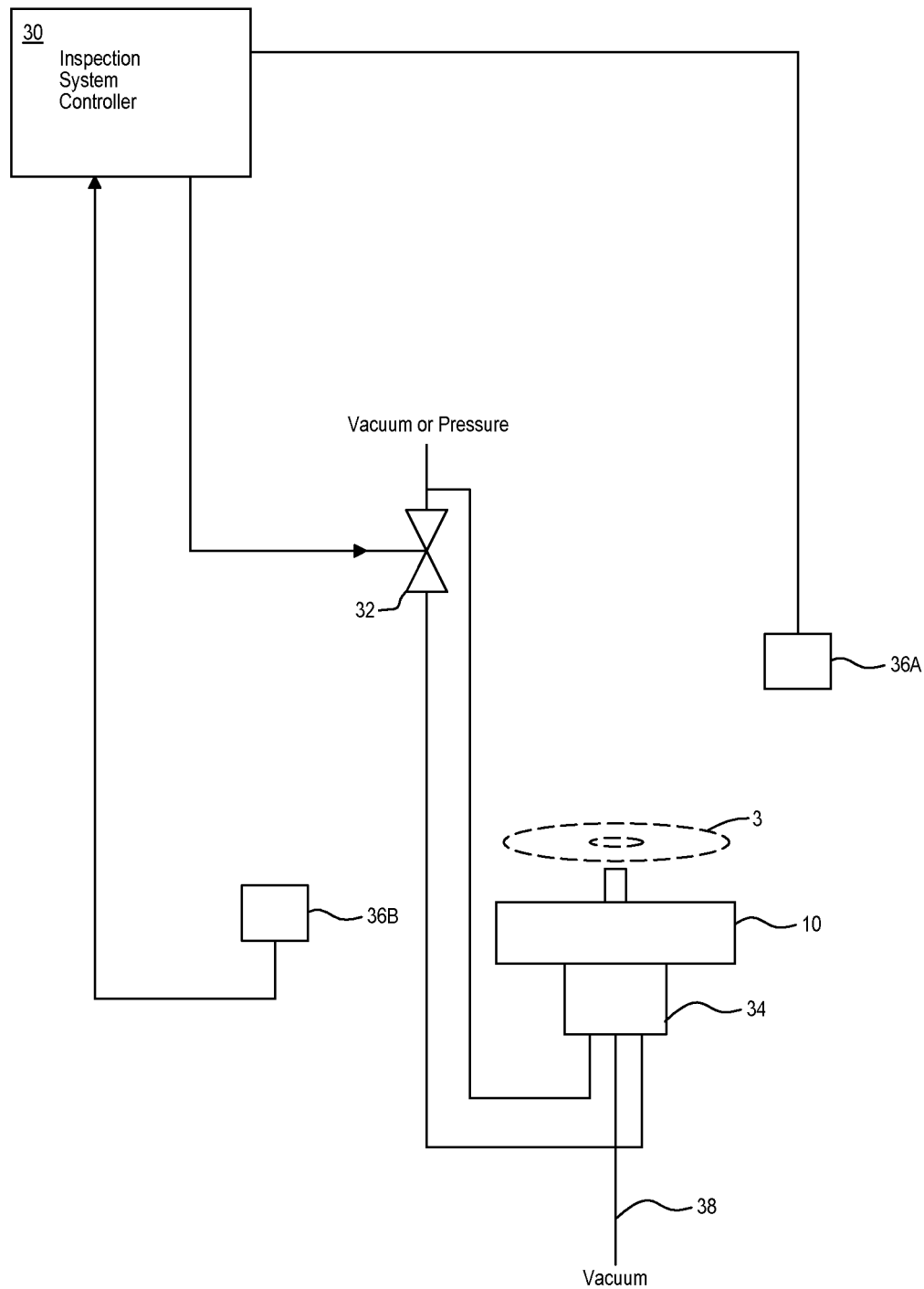
FIG. 4 is a block diagram of a system incorporating a disc spindle in accordance with an embodiment of the present invention.

Referring now to FIG. 4, a block diagram of a system in which a disc spindle in accordance with an embodiment of the present invention is incorporated. An inspection system controller 30 provides control of a motor 34 that rotates spindle 10, to rotate media disc 3 in front of an optical inspection head 36 that is also interfaced to inspection system controller 30. Vacuum or pressure is applied to spindle 10 via a vacuum or pressure source and a valve 32 controlled by inspection system controller 30, which controls the clamping and unclamping of media disc 3. The continuously applied vacuum or pressure floats the air bearing of spindle. Another vacuum source 38, which may alternatively be the continuous vacuum source supplied to valve 32 if vacuum is used to float the air bearing and control the clamp, removes particulate through one or more channels in spindle 10 that remove particulate generated within spindle or by contact with media disc 3. The vacuum can also remove any particulate introduced from the pressure supply in accordance with the techniques described above.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A disc spindle for securing and rotating a media disc in a clean room environment, comprising:
    a disc clamp for detachably securing the media disc to the spindle; and
    a spindle body coupled to the disc clamp, wherein the spindle body has a vacuum port for communication with a vacuum system and a vacuum channel for removing particulate in communication with the vacuum port and terminating on at least one location within the disc spindle, wherein the vacuum channel extends through at least a portion of the disc clamp for removing particulate generated due to moving parts of the disc clamp.

2. The disc spindle of claim 1, wherein the spindle body comprises:
    a stator having a recess for accepting a rotor;
    a rotor positioned within the bearing base and mechanically coupled to the disc clamp, wherein a gap is defined between a face of the recess and a corresponding face of the rotor, wherein when a gas flow is provided in the gap, the rotor is floated from contact with the stator to reduce friction; and
    a shroud extending over the gap and around the rotor for communication with the vacuum system, wherein gas and particulate is continuously removed from the gap to prevent contamination of an environment around the disk spindle wherein the vacuum channel terminates within the shroud.

3. The disc spindle of claim 1, wherein the vacuum channel terminates at a clamp of the disc clamp, whereby particulate generated by contact with a media disc is removed through the vacuum channel.

4. The disc spindle of claim 1, wherein the disc clamp comprises:
a disc clamp body; and
a cap formed from a flexible material affixed to an end of the disc clamp body for accepting the media disc by insertion of a circular aperture in the center of the media disc over the cap, wherein the cap has a substantially cylinder-shaped profile extending along a first portion of the cap in a direction of a central axis of the clamping disc clamp for contacting an inside face of the circular aperture, wherein the cap has a clamped and an unclamped state, wherein when the cap is in the clamped state the first portion of the cap is expanded in cross-section to apply force around the inside face of the circular aperture to secure the media disc to the disc clamp without substantially contacting an outer face of the media disc, and wherein when the cap is in the unclamped state, the cap applies substantially no force to the inside edge of the circular aperture.

5. The disc spindle of claim 4, wherein the cap defines radial slits to enhance the flexibility of the cap, wherein the radial slits are in communication with the vacuum channel to remove particulate from the volume around the clamp.

6. The disc spindle of claim 4, further comprising an actuator extending through the disc clamp body to the cap, wherein the actuator is coupled to the cap to compress the first portion of cap in the direction of the disc clamp body to place the cap in the clamped state, and wherein the vacuum channel extends to a channel which the actuator moves within the disc clamp body, whereby particulate generated by motion of the actuator is removed through the vacuum channel.

7. The disc spindle of claim 4, wherein the actuator is mechanically coupled to a fluid-operated piston operated by vacuum provided through the vacuum channel for moving the actuator to compress the first portion of the cap to the clamped state.

8. A method of removing particulate from a disc spindle for securing and rotating a media disc in a clean room environment, the method comprising:
securing the media disc to the spindle at a disc clamp; and
applying a vacuum to a vacuum port of the spindle to remove particulate in through vacuum port from at least one location within the disc spindle, wherein the applying applies vacuum to a vacuum channel that extends through at least a portion of the disc clamp for removing particulate generated due to moving parts of the disc clamp.

9. The method of claim 8, further comprising:
rotating the media disc with a rotor positioned within a bearing base of the spindle and mechanically coupled to the disc clamp, wherein the rotor and bearing base form an air bearing, wherein when a gas flow is provided in a gap between the rotor and the bearing base, the rotor is floated from contact with the bearing base to reduce friction; and
providing a shroud extending over the gap and around the rotor for communication with the vacuum port, wherein gas and particulate is continuously removed from the gap to prevent contamination of an environment around the disc spindle.

10. The method of claim 9, wherein the applying applies vacuum to a vacuum channel that terminates at a clamp of the disc clamp, whereby particulate generated by contact with a media disc is removed through the vacuum channel.

11. The method of claim 10, further comprising locating the media disc on the disc clamp by inserting a circular aperture in the center of the media disc over an end of a cap formed from a flexible material that is affixed to an end of the hub, wherein the securing secures the media disc by expanding a substantially cylinder-shaped profile of the cap that extends along at least a first portion of the cap in a direction of a central axis of the hub, and further comprising releasing the media disc from the disc clamp by contracting the cylinder-shaped profile of the cap.

12. The method of claim 11, wherein the cap defines radial slits to enhance the flexibility of the cap, wherein the radial slits are in communication with the vacuum channel to remove particulate from the volume around the clamp, whereby the applying applied vacuum through the radial slits.

13. The method of claim 12, wherein the securing and releasing comprise compressing and releasing the first portion of the cap in the direction of the disc clamp by moving an actuator extending through the disc clamp to the cap, wherein the actuator is mechanically coupled to the cap and wherein the vacuum channel extends to a channel which the actuator moves within the disc clamp body, whereby particulate generated by motion of the actuator is removed through the vacuum channel.

14. The method of claim 13, wherein the actuator is actuated by the vacuum applied by the applying to compress the cap and expand the cylinder-shaped profile of the first portion of the cap.

15. A disc spindle for securing and rotating a media disc in a clean room environment, comprising:
a disc clamp for detachably securing the media disc to the spindle; and
a spindle body coupled to the disc clamp, wherein the spindle body has a vacuum port for communication with a vacuum system and a vacuum channel for removing particulate in communication with the vacuum port and terminating at an at least one location within the disc spindle;
a stator within the spindle body having a recess for accepting a rotor;
a rotor positioned within the bearing base of the spindle body and mechanically coupled to the disc clamp, wherein a gap is defined between a face of the recess and a corresponding face of the rotor, wherein when a gas flow is provided in the gap, the rotor is floated from contact with the stator to reduce friction; and
a shroud extending over the gap and around the rotor of the spindle body for communication with the vacuum system, wherein gas and particulate is continuously removed from the gap to prevent contamination of an environment around the disk spindle, and wherein the vacuum channel terminates within the shroud.

16. A method of removing particulate from a disc spindle for securing and rotating a media disc in a clean room environment, the method comprising:
securing the media disc to the spindle at a disc clamp;
applying a vacuum to a vacuum port of the spindle to remove particulate in through vacuum port from at least one location within the disc spindle;
rotating the media disc with a rotor positioned within a bearing base of the spindle and mechanically coupled to the disc clamp, wherein the rotor and bearing base form an air bearing, wherein when a gas flow is provided in a gap between the rotor and the bearing base, the rotor is floated from contact with the bearing base to reduce friction; and providing a shroud extending over the gap and around the rotor for communication with the vacuum port, wherein gas and particulate is continuously removed from the gap to prevent contamination of an environment around the disc spindle.

\* \* \* \* \*